United States Patent

[11] 3,572,521

| [72] | Inventors | Donald M. Grey<br>Selma;<br>Lee D. Butler, Kingsburg, Calif. |
|---|---|---|
| [21] | Appl. No. | 828,910 |
| [22] | Filed | May 29, 1969 |
| [45] | Patented | Mar. 30, 1971 |
| [73] | Assignee | Sperry Rand Corporation<br>New Holland, Pa. |

[54] RETRIEVER ATTACHMENT FOR A BALE WAGON
1 Claim, 3 Drawing Figs.

[52] U.S. Cl. .................................. 214/6B,
214/501
[51] Int. Cl. .................................. B65g 57/08
[50] Field of Search .......................... 214/501,
505, 506, 6 (B), 518

[56] References Cited
UNITED STATES PATENTS

| 3,401,810 | 9/1968 | Grey .............................. | 214/6(B) |
| 3,412,882 | 11/1968 | Stockwell .................... | 214/501 |

*Primary Examiner*—Albert J. Makay
*Attorneys*—Joseph A. Brown, John C. Thompson, James J. Kennedy and George C. Bower

ABSTRACT: The invention relates to a bale wagon for retrieving a stack of bales using a removably mounted spiked retrieving bar which is attached to the wagon transfer table during retrieval and stored beneath the wagon load bed during other wagon operations.

Patented March 30, 1971 3,572,521
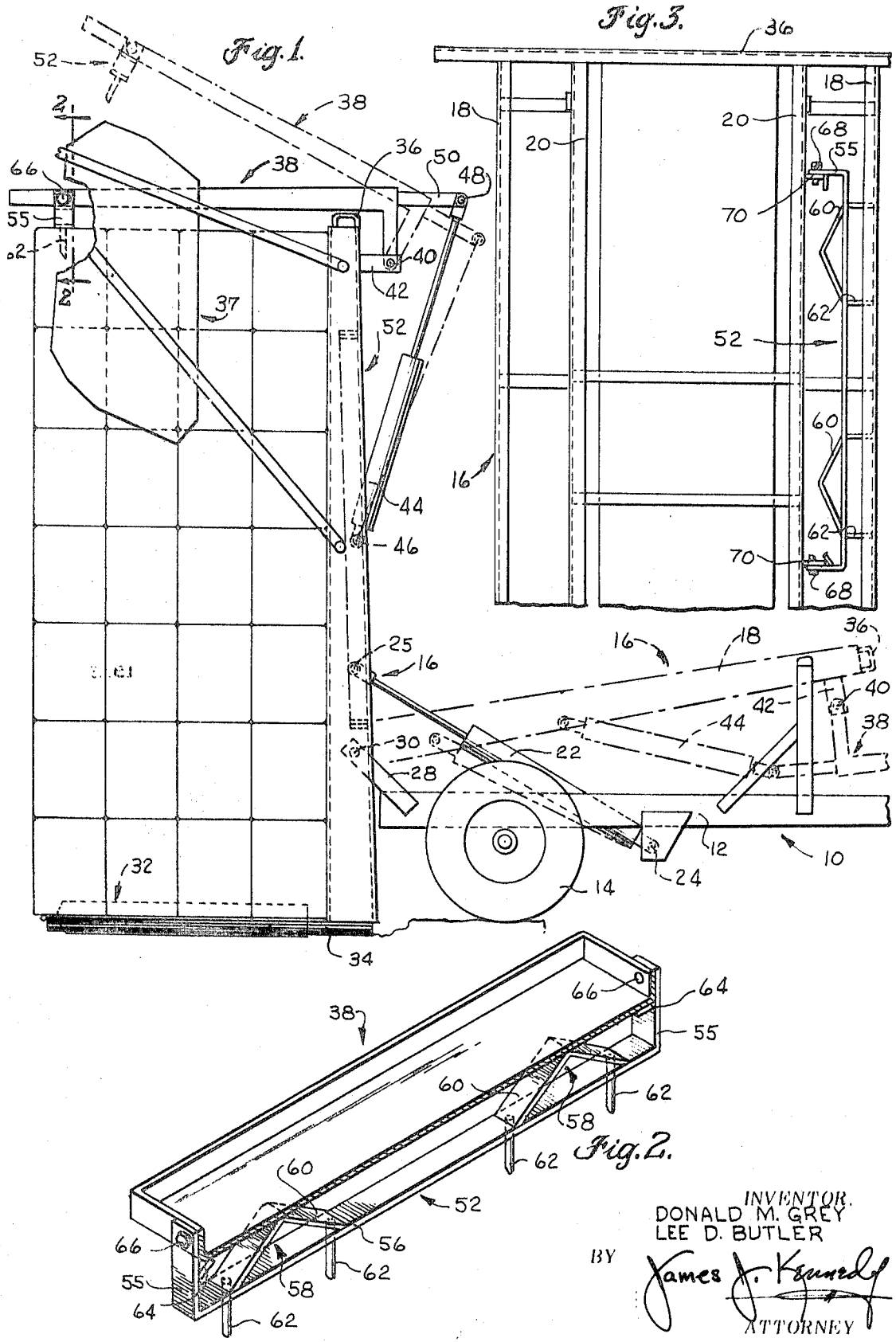

3,572,521

RETRIEVER ATTACHMENT FOR A BALE WAGON

BACKGROUND OF THE INVENTION

The present invention relates generally to bale wagons and specifically to bale wagons which will retrieve a bale stack after it has been deposited on the ground or floor of a storage area.

Bale wagons which are capable of automatically picking up bales from the ground and forming them into a stack transportable on the wagon to a discharge point are well known in the art. U.S. Pat. No. 2,848,127 issued Aug. 19, 1958, to Grey discloses such a wagon. This wagon is provided with a pickup, a receiving bed, a transfer table and a load bed forms a stack of bales on the load bed which may be discharged in a composite mass on the ground. This known type of wagon was further refined so that in addition to the stacking operation, the wagon could also retrieve a complete bale stack from a storage area. Using this improved type of wagon, the operator could take care of stacking and retrieving with a single machine rather than needing two or more machines which were previously necessary. A wagon of this type has been shown and described in U.S. Pat. No. 3,401,810, issued to Grey on Sept. 17, 1968. To retrieve a bale stack using this machine, it was necessary to have the transfer table disposed at right angles to the load bed so that the transfer table could grippingly engage the top of the vertical bale stack to clamp the stack between the table, the tines and the vertically disposed load bed. To help with the stack gripping, the transfer bed was provided with a plurality of spiked members which were engageable with the bale stack.

The single bale unloading wagon which reflected a further refinement of the earlier Grey-type wagon, was also designed to stack and retrieve bales in addition to automatically unloading them one at a time. This type of wagon, a wagon capable of single bale unloading, has been described in U.S. Pat. No. 3,502,230. To permit this wagon to retrieve a bale stack, it is necessary to provide means for engaging and stabilizing the bale stack which could be mounted on the transfer bed easily during the stack retrieval operation, but completely removable during the loading and single bale unloading operations. This engaging means had to be portable and had to be easily stored on the machine when not in use.

SUMMARY OF THE INVENTION

Accordingly then, the primary object of this invention is to provide a bale engaging means which may be removably mounted on the transfer bed and brought into engagement with the bale stack by actuation of the transfer table disposing it into gripping engagement with the stack during a retrieval operation.

Another object of the invention is to provide a spiked retrieving bar which would be engageable both with the transfer bed and the bale stack during a retrieval operation and removably secured to the transfer table so that it could be stored during other operations of the machine.

A further object of the invention is to provide a retrieving bar which, when stored, would be removably secured to the underside of the wagon load bed so as to be easily accessible.

Other objects of the invention will become apparent from the complete specification and from the appended claims.

BRIEF DESCRIPTION OF THE DRAWINGS

FIG. 1 is a fragmentary side view of a bale wagon illustrating the spiked retrieving bar of the present invention on the transfer bed with the load bed in the vertical stack retrieving position;

FIG. 2 is an isometric view of the retriever bar as applied to the transfer bed and taken in the direction of the arrows 2–2 in FIG. 1; and FIG. 3 is a fragmentary view looking at the underside of the load rack and illustrating the retriever bar in its stored position under the load rack.

DESCRIPTION OF THE PREFERRED EMBODIMENT

Referring generally to FIG. 1 of the drawing, a bale wagon having a chassis structure 10, comprised of longitudinally extending beam members 12 supported on wheels 14, is adapted to move over the ground. Pivotally mounted on the rearward portion of the chassis structure 10 is a load bed means 16 which, as can be seen in FIG. 3, is comprised of fore-and-aft extending frame members 18 and 20. The hydraulic cylinder 22 is pivotally mounted by a cylinder end to the chassis structure at 24 and to the load bed by the rod end 25. Bracket structures 28 fixed to the longitudinal beam members 12 extend upwardly and rearwardly therefrom and form a pivotal connection to the load bed 16 at 30, as illustrated in FIG. 1. The load bed 16 is provided with a movable load rack 32 and fork members 34 which are fixed by their lower ends to the load bed and extend generally perpendicularly outwardly therefrom. A box beam member 36 forms the forward edge of the load bed and extends thereacross, as shown in FIG. 3. Side shield means 37 are also provided at the front end of the load to help stabilize the bale stack carried thereby.

A transfer table 38 is pivotally connected to the load bed and is pivotal with respect to the load bed and the chassis structure by means of a pin connection 40 at depending brackets 42. Brackets 42 are fixed by their upper ends to the load bed. The transfer table is pivotally actuated by means of a hydraulic cylinder 44, the cylinder being pivotally connected by its cylinder end at 46 to the load bed and by its rod end at 48 to the rearwardly extending link member 50 which extends outwardly and is fixed to the transfer table 38.

A retrieving means 52 is removably connected adjacent the forward edge of the transfer table 38 as shown in FIGS. 1 and 2. The retrieving means is comprised of a generally U-shaped bar member 54 having depending legs 55 connected by a bight portion 56. A plurality of brace members are welded or otherwise fixed to the underside of the retrieving means and extend between the retrieving means and the upper surface of the transfer bed. In this instance, the brace means are comprised of generally V-shaped members 60 which are fixed to the bight portion in an inverted fashion so that the apex of the V is engageable with the upper edge of the transfer table. It will be understood by those skilled in the art, however, that the brace members could be of any suitable configuration. A plurality of spikes 62 are fixed to the outer surface of the bight portion 56 by any suitable means and extend outwardly therefrom. Tabs 64 extend inwardly from the leg members 55 and are engageable with the surface of the transfer table to further brace and support the retrieving means. Bolts 66 are used to removably mount the leg portions 55 of the retrieving means to the transfer table 38, as shown in detail in FIG. 2.

The retrieving bar is also adapted to be removably mounted on the wagon in a stored position when not in use. This position is indicated generally in FIG. 1 and specifically in FIG. 3 of the drawings. The spiked retrieving means 52 is removably mounted on tabs 70 by bolts or pins 68 to the underside of the load bed 16.

When the bale wagon is to be used to retrieve a stack of bales from a deposited position on the ground, or elsewhere, it is necessary to position the rolling rack 32 in its rearward most position, that position being shown by the dotted lines in FIG. 1, where it is in engagement with the fixed fork members 34. The load bed 16 is then pivoted to a generally vertical position with respect to the chassis structure 10 by actuation of hydraulic cylinder 22 and the retrieving means 52 is removed from its stored position under the load bed and it is bolted to the forward end of the transfer table 38 so that its spikes extend outwardly from the table, as shown in FIG. 1. The wagon is then backed toward the stack so that the rolling rack and fixed fork members are forced to slide under the bale stack until the forward edge of the stack is in abutting relation with the load bed. The transfer table is then pivoted to a generally transverse position with respect to the load bed by actuation of hydraulic cylinder 44 so that the retrieving means 52 is brought into engagement with the bale stack. The spike members 62 penetrate bales in the stack, as illustrated in FIG. 1, and the transfer table now grippingly engages the stack between the rolling rack and the fixed fork members and the load bed. By pivoting the load bed back to its inclined position shown by the dot-dash lines of FIG. 1, or its load carrying position, the complete bale stack may be transported to another location where it may be single bale unloaded by the wagon, or it may be discharged again as a composite stack.

As can be seen from the relationship of the load bed and transfer table, when the wagon is in the stack retrieving position, the transfer table would not be able to grippingly engage the stack of bales to lend additional support to the stack as the load bed is tilted unless the retrieving means extension were placed at the forward edge of the table. This results from the fact that the transfer table 38 is pivotally connected to the load bed 16 and when it pivots to an upright or vertical position with respect to the load bed, the transfer table comes into engagement with the box beam member 36 which extends across the forward edge of the table, limiting further vertical movement. By making the retrieving means removably mounted on the transfer table 38, the wagon may be adapted to form a stack of bales on the load bed, discharge the entire stack from the load bed in a composite stack, single bale unload the bale stack from the transfer table, or retrieve an entire stack of bales from the ground, or other deposited position.

When the wagon is being used in an operative mode under any conditions other than stack retrieval, then the retrieving means 52 is unbolted from the transfer table and positioned under the load bed in its stored position.

While this invention has been described in connection with a single embodiment, it will be understood that this embodiment is capable of modification and that this application is intended to cover any variations, uses, or adaptations following, in general, the principles of the invention and including such departures from the present disclosure as come within the known or customary practice in the art to which the invention pertains, and as fall within the scope of the appended claims.

We claim:

1. In a bale wagon, the combination comprising: a longitudinally extending chassis structure; wheel means rotatively mounted to said chassis structure; a load bed pivotally mounted to said chassis structure about an axis extending transversely the rear thereof, said load bed being swingable about said axis from a normal horizontal position overlying said chassis structure to a vertical position for stacking or retrieving stacks; a transfer table pivotally mounted to the front of said load bed about an axis extending transversely thereacross and swingable from a position generally parallel to said load bed to a position substantially normal with respect to said load bed, said transfer table being adapted to receive bales, form them into tiers, and successively stack the tiers on said load bed to form a stack; a generally U-shaped bar disposed across the upper surface of said transfer table near the front thereof and including a pair of spaced apart legs and a bight portion extending between said legs, said legs being detachably secured to opposite sides of said transfer table, whereby said U-shaped bar may be readily disattached and stored about the underside of said transfer table; brace means fixed to the underside of said bight portion and engageable with the upper surface of said transfer table for bracing said U-shaped bar; and laterally spaced apart spikes fixed to the upper surface of said bight portion and projecting therefrom for engagement with the top layer of a stack during retrieving, thereby providing a positive means for gripping the stack.